Nov. 10, 1970  O. IMGRUND ET AL  3,538,723
HOLDING AND TRANSPORT APPARATUS FOR VARIABLE-THICKNESS
SHEET MATERIAL, PARTICULARLY TANNED SKINS
Filed March 4, 1969  4 Sheets-Sheet 1

OTTO IMGRUND,
ALBERT MUTH &
HANS HELMUT BRENDEL,
  Inventors

United States Patent Office 3,538,723
Patented Nov. 10, 1970

3,538,723
HOLDING AND TRANSPORT APPARATUS FOR VARIABLE-THICKNESS SHEET MATERIAL, PARTICULARLY TANNED SKINS
Otto Imgrund, Mulheim (Ruhr), Albert Muth, Oberursel, and Hans Helmut Brendel, Arnoldshain, Germany, assignors to Maschinenfabrik Turner AG, Oberursel, Taunus, Germany, a corporation of Germany
Filed Mar. 4, 1969, Ser. No. 804,096
Claims priority, application Germany, Sept. 11, 1968, 1,785,325
Int. Cl. C14b 1/18
U.S. Cl. 69—10     9 Claims

ABSTRACT OF THE DISCLOSURE

To hold, or transport material having randomly varying thickness, such as tanned hides, for example steer hide, cow hide and the like, in which the skin is placed on a support and held thereagainst by means of sectionalized support pads, or transport rollers, each one of the support pads or rollers being separately movable against the skins and pressed resiliently thereagainst by compressed air, the pressure for each support pad or roller being variable in accordance with sensed thickness of the material thereunder.

---

The present invention relates to an apparatus to apply pressure, in small areas, to hold material of variable thickness, such as tanned skins and hides against a support, and more particularly to provide a transport arrangement in which uniform pressure is exerted against the rollers bearing against the skins to feed the skins to a splitting machine.

Skins derived from different animals have randomly varying thickness; when transporting such skins, for example to a splitting machine, it is important that the pressure exerted against the skin by transport rollers be uniformly applied thereover. Not only the thickness, but also the resiliency, structure, and texture, as well as the density and particular composition of the skin may vary with the width of the skin. Even otherwise identical skins may have different surface, or other properties due to differences in moisture content. Yet, it is a requirement of the leather industry that the resulting skin must be uniform. Skins of different thicknesses may require different treatment—or treatment duration to avoid non-uniformity of the final leather. One comparatively simple solution is to split the pre-treated skins to a uniform thickness. Nevertheless, before such splitting to a uniform thickness can be done, apparatus is necessary to support the skins, with uniform pressure, and transport the skins with uniform pressure thereacross, although the thickness may vary from point to point, or region to region.

Skins are frequently transported by means of transport rollers, the skins passing between a pair of rollers or over a support plate and beneath a roller. If the distance between the roller and the support plate (or counter-roller) is constant, thicker portions of the skin will be compressed, while thinner portions may slip. Compression of the thicker portion may deleteriously influence subsequent treatment. Additionally, distortion of the skin from a flat condition may result and further the dimensions of the skin may be changed, at least for some time, the skin slowly reverting back to its original thickness, which causes difficulty during processing.

It is accordingly an object of the present invention to provide an apparatus which will support, or transport material of randomly varying thickness, and particularly animal skins, with uniform pressure, and which is simple to construct, to adjust and to maintain.

SUBJECT MATTER OF THE PRESENT INVENTION

Briefly, a transport, or support plate or roller is provided, against which a plurality of counter elements are arranged, in the form of pads (for stationary support) or roller segments (for transport) the elements being each individually movable towards and away from the support plate to compensate for variations in the thickness of the skin. To obtain uniform pressure thereagainst, the elements are resiliently pressed against the support plate, or roller by a compressed fluid, such as compressed air. According to a feature of the invention the thickness of the skin is sensed and the pressure applied to individual elements is regulated in accordance with sensed thickness.

The invention will be described by way of example with reference to the accompanying drawings, wherein.

Figure 1:
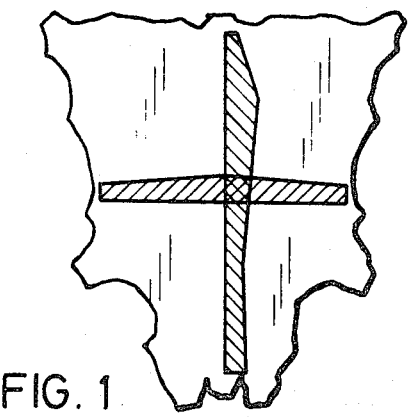
FIGS. 1 and 2 illustrate the outline of hides with cross-sectional cuts, indicated in cross-hatched areas, FIG. 1 illustrating an ox-hide and FIG. 2 a bull-hide.
Figure 2:
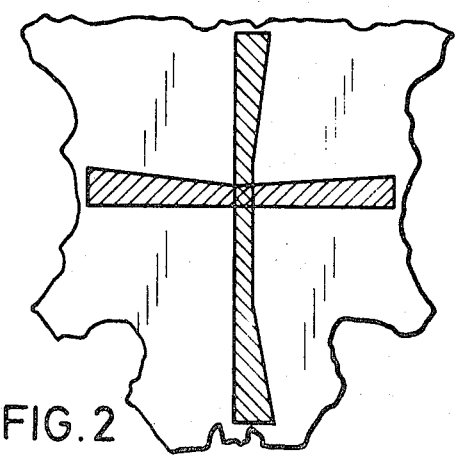
Figure 3:
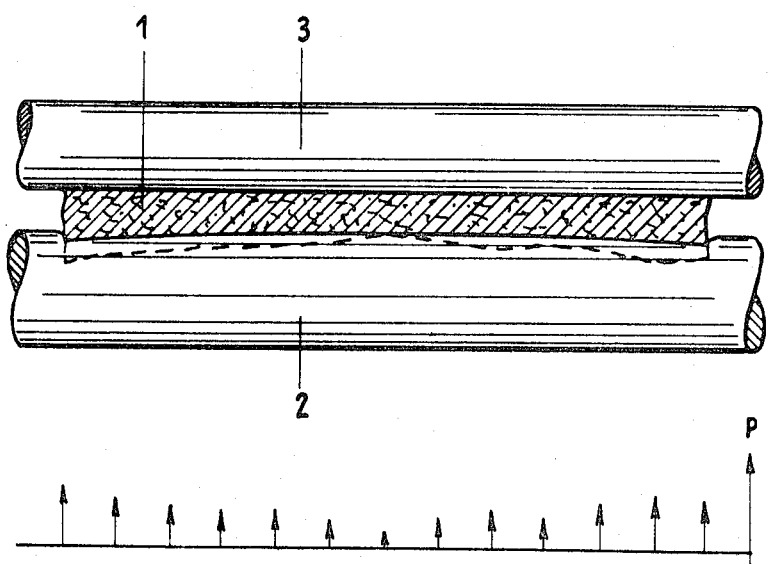
FIG. 3 illustrates the action of a known rubber-surface roller, with a force diagram below, the length of the arrows representing applied pressure to the skin.

The problem which arises in the treatment of animal skins is best illustrated by the longitudinal and cross-sectional thickness diagrams of FIGS. 1 and 2, which clearly show that the distribution of thickness in ox-hide differs from that of bull-hide. Sequential processing of such hides therefore requires apparatus which will individually match the application of force to the thickness distribution of the hides, taken transversely. FIG. 3 illustrates the difficulty encountered with conventional apparatus, in which a single rubber-covered roller 2 presses a hide 1 of randomly varying thickness against a support plate 3. As can be seen from the force diagram beneath the cross-sectional view of roller 2, hide 1 and support 3, high compressive forces are exerted against the skin at the ends whereas the force exerted against the skin at the center is small. The actual adjustment of the diameter of the shaft of roller 2 (which is not shown) with respect to support plate 3 thus must be based on a compromise, which may cause excessive force at the edges of the skins, with little or no force being applied at the center.

The apparatus, as schematically illustrated in FIG. 3, thus provides a support or transport arrangement in which the pressure applied to the article to be transported, that is to the skin of variable thickness, varies across the skin itself. The pressure applied is thus not individual to the thickness of the material, but must be average. These differences in pressure cause deformation of the shaft of the rubber-covered roller 2, or require a rubber-covered roller 2 mounted on a flexible shaft. Both use of a flexible shaft, as well as permitting deformation of a shaft introduces difficulties and substantial wear at the holding bearings, as well as on the rolls. Still, it is not entirely possible to compensate substantial differences in thickness of the skin without excess pressure in some parts and under pressure on other. Such excess pressure may even damage the skin surface, particularly when a counter roller is used which has a knurled surface.

In order to overcome this difficulty, it has previously been proposed to utilize a counter roller, or counter pressure application element which is sub-divided into sectors. The amount of pressure applied by the different sectors then was set by springs, or by individual loading by means of weights. Both solutions did, however, have the difficulty that the amount of pressure to be applied at individual points is difficult to change, because either a spring setting had to be changed, or weights had to be adjusted, both causing substantial technical difficulties if they are to be carried out while a skin is moving beneath a transport roller.

Figure 4:
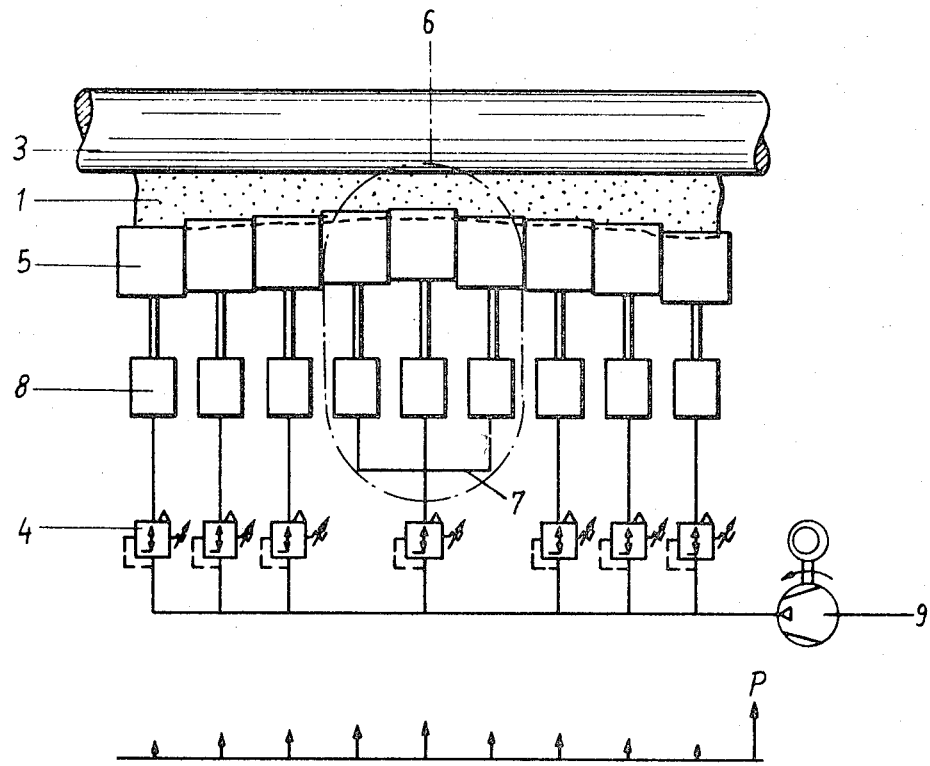
FIG. 4 is a schematic view of a support arrangement in accordance with the present invention, and a force diagram wherein the length of the arrows represent applied force.

In accordance with the present invention, the principle of which is illustrated in FIG. 4, segmented pressure elements 5, which may be stationary pads or rollers if the material thereunder is movable are loaded by means of pneumatic pressure, applied from a pressure source 9 over individually adjustable control valves 4. Elements 8, schematically illustrated in FIG. 4, represent pressure equalization chambers to permit small pressure fluctuations and prevent transients from affecting the ultimate working pressure applied by element 5. Pressure equalization chambers 8, when made to have a big enough volume, can compensate for minor changes in thickness of the skin 1 passing beneath elements 5, so that the average working pressure as determined by the pressure of pump 9 and valve 4 will be maintained. The adjustment of the working pressure by means of elements 4 can be done manually, for certain types of skins, or can be sensed by connecting electrical sensing elements, schematically shown in the drawings, in advance of a traveling skin, to sense the thickness thereof, for subsequent regulation of the pressure of the particular element beneath the section of the skin. If desired, certain cross-sectional areas of the skin which, from experience, have substantially the same pressure, as indicated by the region 6 (FIG. 4) can be cross-connected by a single tie-line 7, and controlled by a single valve. The initial pressure of application is represented by the length of the arrows of the force diagram of FIG. 4. As can be seen, the thicker portions of the skin are subjected to lesser pressure so that they will be less compressed enabling, for example, easier penetration of treatment fluids or the like.

Change in speed of transport of skins 1 beneath an arrangement of FIG. 4, if the elements 5 represent rollers, can be compensated by quick uniform change of pressure by changing the output from pump 9; link-up of roller speed and application of pressure can be previously set, from experimental data, and be previously programmed, for example, or controlled automatically from structural and surface characteristics of the material being transported by the apparatus.

Applying only the necessary pressure for proper support or feeding, if elements 5 are rollers, prevent differences in compression of the material and thus differential deformation of the uneven material. The original dimensions will thus be maintained. If the material to be treated is a cow-hide, it has been found that the structurally weakest, that is thinnest parts, are also at the same time the softest and loosest parts of the skin, so that differential application of pressure is particularly advantageous, the proper pressure being uniformly applied, so that the thickness of the material is not influenced by the pressure of applied elements, the inherent resiliency of the pneumatic supply, including the chambers 8, insuring uniformity of appiled force.

Figure 5:
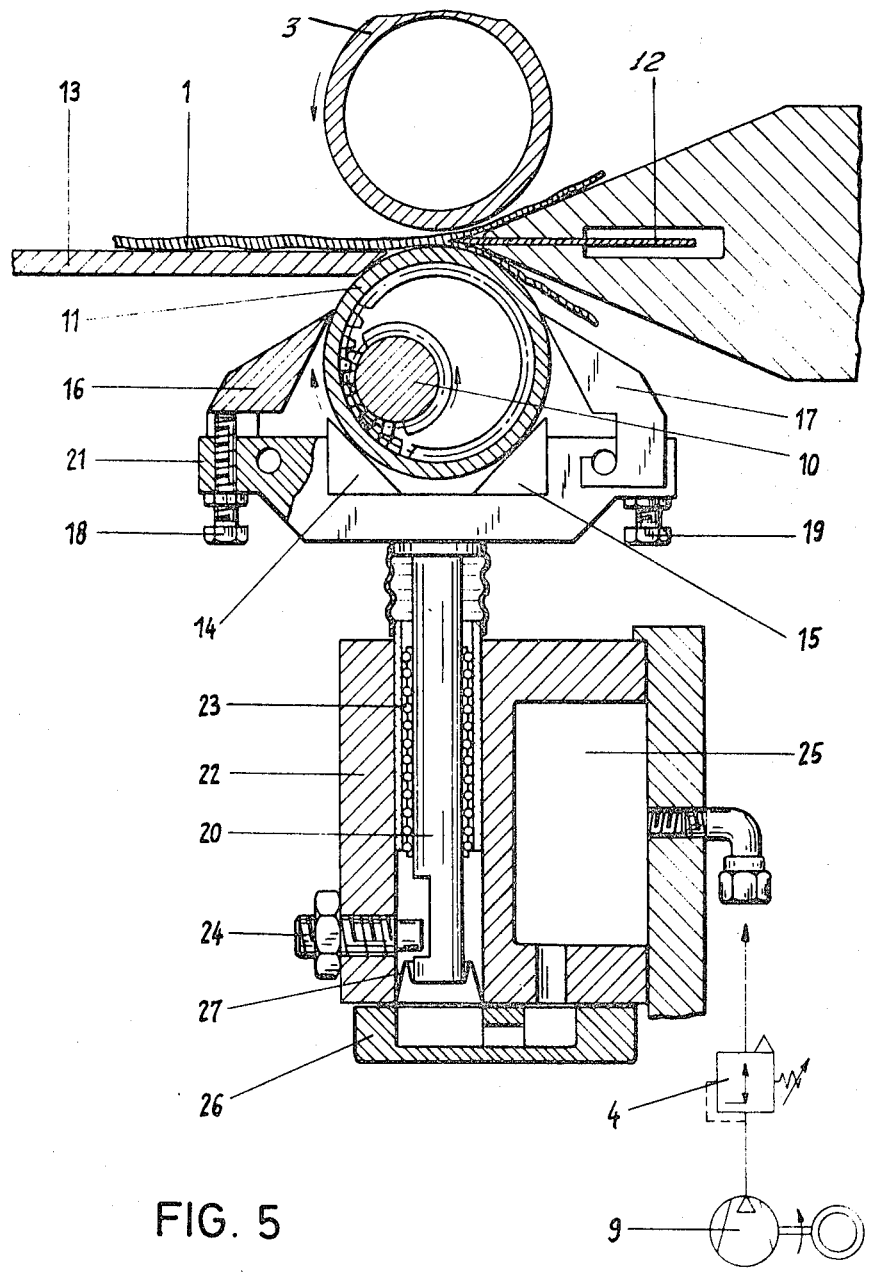
FIG. 5 is a partial longitudinal cross-sectional view through a splitting machine for hides utilizing the concept of the present invention.

FIG. 5 illustrates, in simplified cross-sectional view, a splitting machine utilizing the principles of the present invention. Skin 1 is located between an upper transport roller 3, which has a fixed location with respect to a knife blade 12 (which may be in the shape of a traveling band-type knife) and a support cable 13. A sectionalized counter roller 11, having sectionalized roller elements corresponding to elements 5 (FIG. 4) is located beneath roller 3. The sectionalized rings 11 are held in position by four guide brackets 14, 15, 16, 17, located on a platform 21. The upper guide brackets 16, 17, are adjustable by means of adjustment screws 18, 19. Platform 21 is carried on a carrier rod 20, movably located by means of a ball-bearing 23, in a guide block 22. Ball-bearing 23 reduces friction and permits longitudinal movement (with respect to FIG. 5) of carrier 21, and thus of the sectionalized roller 11.

The limit of travel is adjustable by means of a stop 24. The lower end of the support column 20 is held by a membrane 27, which connects with a chamber formed in a bottom plate 26 connected over an internal expansion chamber 25 to regulating valve 4 and thence to the air pump 9, delivering compressed air. The pressure of application of the particular section 11, is thus controlled by the pressure supplied to the lower side of membrane 27. Drive of the element 11 is obtained from a rotating shaft 10.

Figure 6:
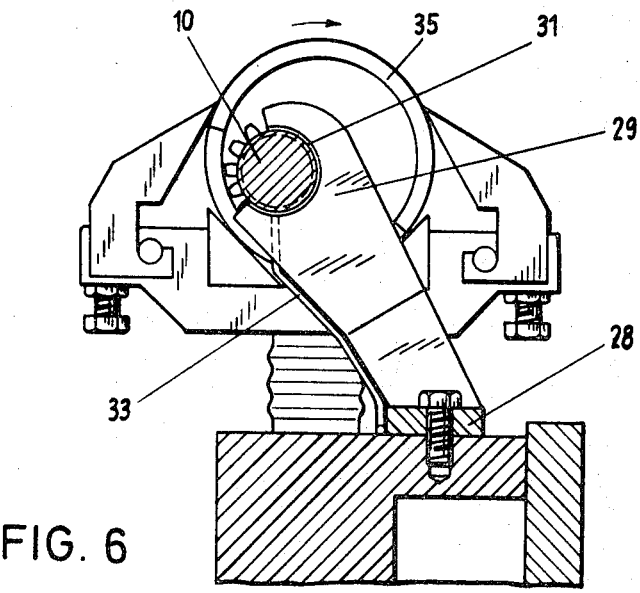
FIG. 6 is a cross-sectional view of a holding arrangement for the drive of the machine of FIG. 5.
Figure 7:
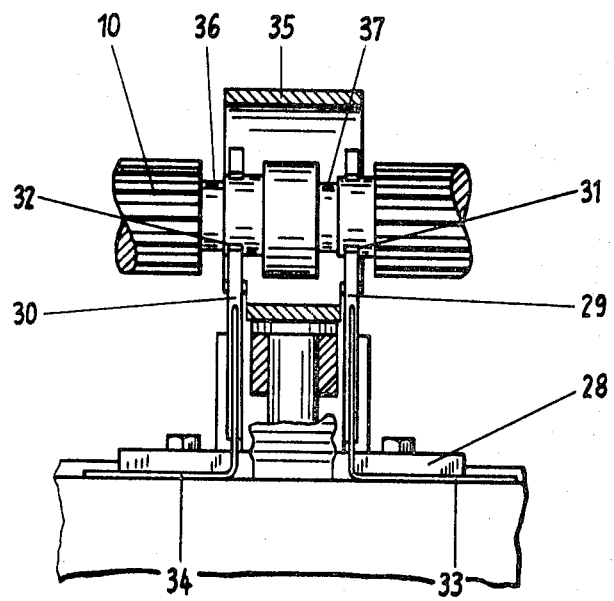
FIG. 7 is a longitudinal view through the bearing assembly of the apparatus of FIG. 6.

The support and connection of rotating shaft 10 is best seen with respect to FIGS. 6 and 7. In actual operation, the diameter of the sectional elements 11 would probably be much greater with respect to the diameter of shaft 10 than shown in the drawing.

The lower bearing portion 28 is formed with a pair of supports 29, 30, each carrying a part of a bearing 31, 32. Lubricating lines 33, 34 supply lubricant. Small up and down motion of individual elements 11 can occur, the elements 11 additionally rolling along drive shaft 10. The shaft itself can be segmented and be formed with reliefs 36, 37 to be slipped out and removed from bearings 31, 32 for replacement of bearing elements and this assembly. The holding brackets for the individual elements 35 corresponding to the segmented ring 11 of FIG. 5 are not further described since they are identical to these shown in FIG. 5.

The amount of pressure applied by the values 4 can be electrically regulated, as schematically illustrated, by connecting an electrical motion-sensor to the valves which control the amount of pressure applied from pump 9. These sensors, well-known in the art, are not shrown since their connection to the valves will be a matter of design.

We claim:
1. Pressure apparatus to apply, selectively, mechanical pressure against sheet material of variable thickness comprising
   a support (3) adapted to have the sheet material placed thereagainst;
   a group of counter elements (5, 11, 35) arranged along an axis tranverse to said sheet material to hold the sheet material against said support;
   and means loading each of said counter elements, individually, to urge said counter elements against the sheet material, with separately adjustable force, said loading means comprising
   means applying pneumatic pressure against said counter elements and means (4) connected to and individually adjusting the amount of pressure being applied to each counter element.

2. Apparatus according to claim 1 including individual pressure equalization chambers (8) connected into the pneumatic circuit interconnecting the individual pressure adjustment means (4) and said counter elements.

3. Apparatus according to claim 1 wherein the amount of pressure applied by said individually adjustable means is determined by sensed thickness of material between said counter element and said support.

4. Apparatus according to claim 1 wherein each counter element includes a support column mounted in a low-friction housing;
   and a flexible membrane is provided supporting said support column on one side thereof, said membrane being subjected to pneumatic pressure on the other side.

5. Apparatus according to claim 1 wherein said support is a roller, and said elements are individually rotatable roller elements.

6. Apparatus according to claim 5 for use in combination with a skin splitting machine, wherein each individual rotatable roll element includes a cylinder (11, 35), a cylinder support and a plurality of guide parts (7, 8, 9, 10) engaging the circumference of said cylinder;
and means supporting said cylinder support including a flexible membrane supporting said cylinder from one side thereof and being subjected to said pneumatic pressure on the other side.

7. Apparatus according to claim 6 wherein said cylinder supporting means includes a housing retaining said membrane, and a pneumatic circuit formed in said housing including a pressure equalization chamber.

8. Apparatus according to claim 6 wherein the cylinder elements are hollow, and a single shaft is provided located in the hollow of said cylinder element approximately at the horizontal diameter thereof, whereby small vertical movement due to pressure changes will not cause loss of drive from said draft to said cylinder element.

9. Apparatus according to claim 1 wherein said means applying pneumatic pressure to said counter elements comprises a common pneumatic connection to at least two of such counter elements and controlled by a single adjustment means.

References Cited

UNITED STATES PATENTS

| | | | |
|---|---|---|---|
| 1,010,752 | 12/1911 | Haines | 69—10 |
| 1,814,111 | 7/1931 | Baxter | 69—13 |
| 2,524,013 | 9/1950 | Hall | 69—10 |
| 3,083,559 | 4/1963 | Eberhardt | 69—10 |
| 3,186,195 | 6/1965 | Braun | 69—10 |
| 3,393,538 | 7/1968 | Mercier | 69—10 |

ALFRED R. GUEST, Primary Examiner

U.S. Cl. X.R.

69—13